(12) United States Patent
Niederhoefer et al.

(10) Patent No.: US 12,482,084 B2
(45) Date of Patent: Nov. 25, 2025

(54) METHOD FOR DETERMINING MATERIAL PROPERTIES FROM FOAM SAMPLES

(71) Applicant: BASF SE, Ludwigshafen (DE)

(72) Inventors: Florian Niederhoefer, Ludwigshafen (DE); Victor Didier Perez Meza, Ludwigshafen (DE); Nikolaus Nestle, Ludwigshafen (DE); Rainer Friehmelt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 373 days.

(21) Appl. No.: 17/781,524

(22) PCT Filed: Dec. 1, 2020

(86) PCT No.: PCT/EP2020/084145
§ 371 (c)(1),
(2) Date: Jun. 1, 2022

(87) PCT Pub. No.: WO2021/110690
PCT Pub. Date: Jun. 10, 2021

(65) Prior Publication Data
US 2023/0005128 A1    Jan. 5, 2023

(30) Foreign Application Priority Data

Dec. 4, 2019  (EP) .................................... 19213450

(51) Int. Cl.
*G06T 7/00* (2017.01)
*G06T 7/136* (2017.01)

(52) U.S. Cl.
CPC ............ *G06T 7/0004* (2013.01); *G06T 7/136* (2017.01); *G06T 2200/04* (2013.01);
(Continued)

(58) Field of Classification Search
CPC ............ G06T 7/12; G06T 2207/20152; G06T 7/0004; G06T 7/0002; G06T 2207/10081;
(Continued)

(56) References Cited

U.S. PATENT DOCUMENTS 6,960,616 B2 * 11/2005 Klotzer .............. B01D 39/1692
428/305.5
7,629,400 B2 * 12/2009 Hyman .................... B41M 5/36
524/106
(Continued)

FOREIGN PATENT DOCUMENTS

EP           2979752 A1 *  2/2016  ............. B01D 53/94
WO   WO-2005003758 A1 *  1/2005  ........... G01N 33/146
(Continued)

OTHER PUBLICATIONS

Michailidis et al., "An image-based reconstruction of the 3D geometry of an Al open-cell foam and FEM modeling of the material response". (pp. 142-147) (Year: 2010).*
Saadatfar et al., "Polymeric foam properties derived from 3D images" (pp. 131-136). (Year: 2004).*
Evan et al., "Image based in silico characterisation of the effective thermal properties of a graphite foam" (pp. 542-558) (Year: 2019).*
Zakaria et al., 2018, Monitoring deformation mechanism of foam cells in polyethylene foams via optical microscopy: Effect of density and microstructure (pp. 957-976). (Year: 2018).*
(Continued)

*Primary Examiner* — Manav Seth
(74) *Attorney, Agent, or Firm* — Lowenstein Sandler LLP

(57) ABSTRACT

The present invention is in the field of methods for determining material properties from foam samples. It relates to a computer-implemented method for determining a material property of a foam sample comprising (a) providing a representation of the sample, (b) extracting at least one structural feature from the representation, wherein the at least one structural feature comprises walls, struts, or nodes (c) providing the at least one structural feature to a material model suitable for obtaining at least one material property from the structural feature, and (d) outputting the at least one material property received from the material model.

13 Claims, 3 Drawing Sheets

(52) U.S. Cl.
CPC .............................. *G06T 2200/24* (2013.01);
*G06T 2207/10056* (2013.01); *G06T 2207/20152* (2013.01); *G06T 2207/30108* (2013.01)

(58) Field of Classification Search
CPC ....... G06T 2207/10004; G06T 2200/04; G06T 2200/08; G06T 7/40; G06T 7/136; G06T 2200/24; G06T 2207/10056; G06T 2207/30108
See application file for complete search history.

(56) References Cited

U.S. PATENT DOCUMENTS

| | | | |
|---|---|---|---|
| 10,830,713 B2* | 11/2020 | Zhang | G01N 23/2251 |
| 11,226,295 B2* | 1/2022 | Koseki | G06T 7/174 |
| 11,547,988 B2* | 1/2023 | Mullens | C10G 3/49 |
| 2006/0210139 A1* | 9/2006 | Carroll | G01N 15/0227 |
| | | | 382/141 |
| 2013/0126774 A1* | 5/2013 | Venkatesh | H10N 30/852 |
| | | | 252/62.9 R |
| 2014/0044315 A1 | 2/2014 | Derzhi et al. | |
| 2019/0070845 A1* | 3/2019 | Chang | B33Y 70/00 |
| 2019/0154597 A1* | 5/2019 | Zhang | G01N 15/088 |
| 2020/0317870 A1* | 10/2020 | Liang | C08L 57/00 |
| 2020/0395102 A1* | 12/2020 | Minami | G01N 33/442 |

FOREIGN PATENT DOCUMENTS

| | | | | |
|---|---|---|---|---|
| WO | 2015080912 A1 | 6/2015 | | |
| WO | WO-2016090297 A1 * | 6/2016 | ............ | C12M 21/08 |
| WO | WO-2017055565 A1 * | 4/2017 | ............... | B01J 2/08 |
| WO | 2018206225 A1 | 11/2018 | | |

OTHER PUBLICATIONS

Jung et al., "In-situ and ex-situ microtensile testing of individual struts of Al foams and Ni/Al hybrid foams" (pp. 104-119) (Year: 2018).*
Srivasta et al., "On the polymeric foams: modeling and properties" (pp. 2681-2692). (Year: 2014).*
Li et al., "Effects of cell shape and strut cross-sectional area variations on the elastic properties of three-dimensional open-cell foams" (pp. 783-806) (Year: 2005).*
Samuel Pardo Alonso, "X-Ray Imaging Applied to the Characterization of Polymer Foams Cellular Structure and Its Evolution", Mar. 1, 2014, pp. 1-293 ; http://cellmet.es/wp-content/uploads/2017/02/16.pdf.
Gibson, et al. "Cellular Solids: Structure and Properties", Cambridge University Press, Second Edition, Aug. 1999, 10 pages, ISBN 978-0-521-49911-8.
International Search Report for PCT/EP2020/084145 mailed Feb. 2, 2021, 3 pages.
European Search Report for EP Patent Application No. 19213450.0, Issued on May 25, 2020, 3 pages.
International Search Report for PCT Patent Application No. PCT/EP2020/084145, Issued on Feb. 12, 2021, 4 pages.
Pardo Alonso Samuel, "Chapter: 4.10 Protocols of image analysis", X-Ray Imaging Applied to the Characterization of Polymer Foams' Cellular Structure and Its Evolution, Mar. 2014, pp. 146-156.
Pardo Alonso Samuel, "Chapter: 6 3D Studies on Cellular structure", X-Ray Imaging Applied to the Characterization of Polymer Foams' Cellular Structure and Its Evolution, Mar. 2014, pp. 216-217.

* cited by examiner

METHOD FOR DETERMINING MATERIAL PROPERTIES FROM FOAM SAMPLES

CROSS-REFERENCE TO RELATED APPLICATION SECTIONS

The present application is a national stage entry of International Application No. PCT/EP2020/084145, filed on Dec. 1, 2020, which claims priority to European Patent Application No. 19213450.0, filed on Dec. 4, 2019, the contents of which are hereby incorporated by reference in their entirety.

The present invention is in the field of methods for determining material properties from foam samples, in particular from foam sample images.

Material properties, such as mechanical, thermal, or chemical properties, strongly depend on the structure of the materials, both on a macroscopic as well as on a microscopic level, in particular in a porous material such as a foam. Determining the material properties usually requires tests which involve a lot of effort. The samples must be prepared, appropriate test equipment must be provided, and test protocols must be strictly followed. Well trained personnel are needed for this reason. It is therefore desirable to provide a faster way involving less manpower and fewer apparatuses.

WO 2015/080 912 A1 discloses a method of digitally modelling a reservoir in oil fields from computer tomography images on core samples. By running simulations on these models, oil field characteristics may be obtained. However, a lot of specific assumptions and physics have to go into the models, so they are hardly applicable for anything else than oil field analysis.

WO 2018/206 225 A1 discloses a method of modelling an object from images and compare it to its desired geometry in order to detect defects. However, no material properties are obtained.

US 2014/044 315 A1 discloses a method for increasing the accuracy of a target property value derived from a rock sample. However, this method can hardly be transferred to foam samples.

Samuel Pardo Alonso discloses in his PhD thesis with the title "X-Ray Imaging Applied to the Characterization of Polymer Foams' Cellular Structure and Its Evolution" from Mar. 1, 2014 a method to generate a 3D model from images. However, no material properties are obtained.

It was therefore the object of the present invention to provide a method which can determine material properties with little effort in terms of apparatuses, personnel and time. The method should be variable to a wide range of different foam materials and size scales. The method was aimed to be fast and reliable.

These objects were achieved by a computer-implemented method for determining a material property of a foam sample comprising
(a) providing a representation of the sample,
(b) extracting at least one structural feature from the representation, wherein the at least one structural feature comprises walls, struts, or nodes,
(c) providing the at least one structural feature to a material model suitable for obtaining at least one material property from the structural feature, and
(d) outputting the at least one material property received from the material model.

The present invention further relates to a non-transitory computer readable data medium storing a computer program including instructions for executing steps of the method according to any of the preceding claims.

The present invention further relates to a production monitoring and/or control system for monitoring and/or controlling material properties of a sample comprising
(a) an input unit configured to receive a representation of the sample,
(b) a processing unit configured to extract at least one structural feature from the representation, wherein the at least one structural feature comprises walls, struts, or nodes,
(c) a processing unit configured to providing the at least one structural feature to a material model material model suitable for obtaining at least one material property from the structural feature, and
(d) an output unit configured to output a material property received from the material model.

Preferred embodiments of the present invention can be found in the description and the claims. Combinations of different embodiments fall within the scope of the present invention.

Figure 1:
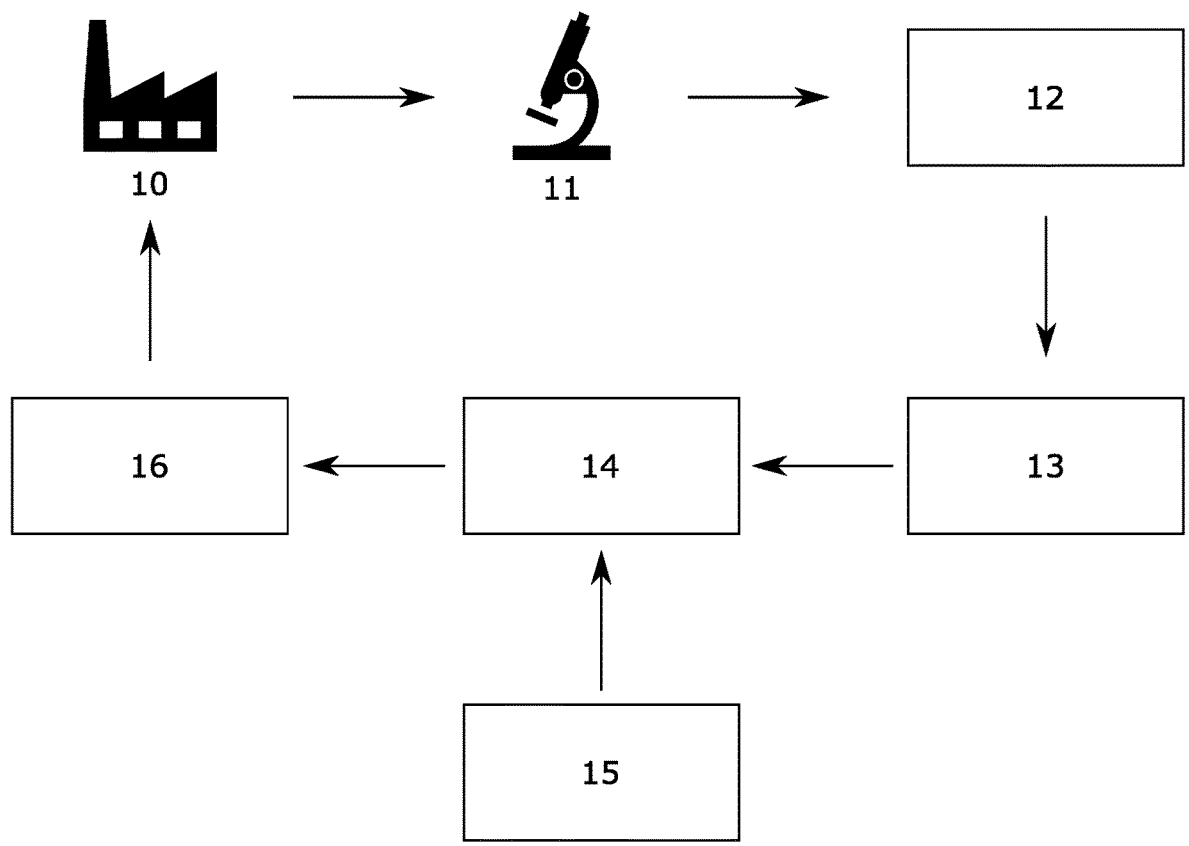
FIG. 1 depicts a possible implementation of the invention.

The method according to the present invention is useful for determining a material property of a foam sample. A sample can be a small piece of a material or a complete workpiece. Foam samples include porous materials such as polymer foams, zeolites, carrier bodies for exhaust catalysts. The inner structure of the sample refers to the distribution of phase boundaries within the sample, for example the phase boundary between a void and the polymer in polymer foams. Features of the inner structure can be on different size scales depending on the sample and the resolution of the images, for example in the micro-range, i.e. 0.1 to 1000 µm, or on the nanoscale, i.e. 1 to 100 nm.

Material properties can be mechanical properties such as Young's modulus, elasticity, tear resistance, wear resistance, friction coefficient; thermal properties such as heat capacity, heat conductivity; electric properties such as electric conductivity or resistivity, dielectric constant; or optical properties such as transparency, refractive index, diffusivity.

A representation of the sample in the context of the present invention is a data structure containing the inner structure of the sample. The representation associates each location in the sample information about the material or a void at that location. The representation can be two-dimensional or three-dimensional, preferably three-dimensional. It is possible that the representation already exists from previous work, is received from a remote computer or a cloud, or is generated on the same computer as the steps of the method according to the present invention. Preferably, the representation is generated from images showing the inner structure of the sample. The representation can have various formats including bitmap like pixel or voxel data, point cloud, triangulated surface model such as in standard triangulation language (STL). The format of the representation has to be suitable to include information about the material and/or void.

Images of a sample can be provided in various ways. For example, they can be obtained directly from a measurement apparatus or obtained from a database containing previous measurements. Various measurements are available, for example photography, optical microscopy or electron microscopy on cut or broken samples or non-destructive methods such computer tomography, magnetic resonance imaging, sonography, or confocal microscopy. The images are usually taken from parallel planes in the sample, however the planes can also stand at an angle to each other. The distance between the planes from which the images are taken is normally not more than the largest feature of the inner structure of the sample. The number of images can vary. More images usually lead to more accurate results. However, the number of images increases the computing time, in particular if the resolution of the images is high. Therefore, it is usually best to use the lowest number of images which result in a sufficient accuracy for a certain sample. The number can range from 5 to 1000, for example 10 to 50 or 100 to 400. The resolution of the images should be high enough such that the features can be clearly recognized, but not too high so the computing time is does not become too long. Typical resolutions of images are between 10×10 to 1024×1024 pixels, wherein the images do not have to be quadratic, so 768×1024 or 512×288 pixels can be used equally well. Preferably, the images are in gray-scale or are converted into gray scale.

Preferably, prior to generating a representation from the images, the images are preprocessed in order to facilitate detection of phase boundaries. Preprocessing can include adjusting brightness, contrast, noise removal, applying thresholds or combinations thereof. Even more preferably, the preprocessing parameters yielding best results in the method according to the present invention are saved and automatically proposed to a user or directly applied to further images to be preprocessed.

Generation of a representation from images can be achieved in various ways. Most of them involve edge or surface detection or segmentation determining the respective phase boundaries. The edge detection converts 3D voxel data into 3D surface data, for example by assigning a threshold gray value to edge voxels, interpolation between voxel gray values, search for maximum gray value derivatives, mid gray value between light air voxel and dark material voxel levels, or local adaptive gray threshold. Reducing noise and artifacts as well as interpolation is subject to many publications known to the skilled person.

Preferably, the representation is generated from images by segmenting the gray-scale image by applying a threshold algorithm, thereby converting the gray-scale into an image in which each color represents one phase, i.e. a certain material or a void. For example, in a foam, the material could be white and the void black. In a composite material containing three materials, the first material could be white, the second material gray and the third material black. In some cases, the segmented image may already be sufficient for the representation. However, to reliably extract structural features from the representation, it is often useful to apply further methods. Preferably, the segmented image is subject to a distance function which assigns each pixel or voxel the distance to the nearest pixel or voxel with a different color. Preferably, after applying the distance function, a watershed algorithm is applied to identify objects such as pores, embedded particles, walls, struts, or nodes. When overflooding the watershed algorithm, it is also possible to determine the center of walls, struts and nodes.

The method according to the present invention comprises (b) extracting at least one structural feature from the representation. Structural features are all features of a sample which are directly linked to its inner structure. Structural features may be related to walls, i.e. the material in between two particles of a different material or between two pores, for example their thickness, curvature, planar expansion or moments. Structural features may also be related to struts, i.e. the material in between three particles of a different material or between three pores, for example their cross section, length, curvature, or moments. Structural features may also be related to nodes, i.e. the material in between four particles of a different material or between four pores, for example their volume, or moments. Structural features may also be related to pores or particles, for example their volume, sphericity, moments. Structural features may also be related to cells, for example their local density, moments. Structural features may also be related to a graph, such as the foam graph, for example connection of pores, walls, cells, struts and nodes.

By evaluating these features, more complex structural features can be obtained. An example is the isolated evaluation of absolute values and their spatial distribution, such as determine gradient in strut length in a sample. Another example is the evaluation under consideration of structural features, which are often relevant in physical models, such as strut length related to size of adjacent pores. Another example is the evaluation of foam graph, such as the number of walls per pore or struts per wall.

According to the present invention, the at least one structural feature comprises walls, struts, or nodes. If only one structural feature is extracted, it has to be either of walls, struts, or nodes. Typically, more than one structural feature is extracted. In this case, at least one of the structural features is walls, struts, or nodes and the others can be one or more of the remaining of walls, struts, or nodes or other structural features as described above. Preferably, the structural features comprise at least two of walls, struts, or nodes, in particular the structural features comprise all, i.e. walls, struts, and nodes.

The extraction of structural features can be achieved in various ways. Suitable algorithms include watershed, distances evaluations, component analysis, local voxel evaluation, or preferably combinations thereof such as at least two of these. These methods are well available in image processing libraries, for example SciKit-image, OpenCV, SimpleCV, NumPy, SciPy, PIL/Pillow, Mahotas, ITK, GraphicsMagick or Cairo. Extracting structural features from a representation has several advantages over other methods such as a measurement method: It is more flexible as it can extract very different features otherwise only accessible by different measurement methods. In many cases, it is more accurate as it tends to be less susceptible to artifacts or disturbing sources.

The method according to the present invention comprises (c) providing the at least one structural feature to a material model suitable for obtaining at least one material property from the structural feature. It is possible to determine only one material property, or, preferably, more than one material properties, such as at least two or at least three.

A material model generally refers to a model which receives structural features as input and outputs associated material properties. Material models include physical models and data-driven models. Physical models employ laws of nature, for example thermodynamics or classical mechanics, to translate structural features into material properties. Quite a few physical models for materials having a cellular structure are for example summarized by L. Gibson and M. Ashby in Cellular Solids, Cambridge University Press, ISBN 978-0-521-49911-8. The physical model may be validated with experimental data.

Data-driven model are trained mathematical models which are parametrized according to a training data to input structural features and output associated material properties without involving any knowledge of laws of physics. The data-driven model is preferably a data-driven machine learning model. The material model can be a linear or polynomial regression, a random forest model, a Bayesian network or a neural network. Preferably, the data-driven model is simplified by using only those structural features into account which, after having been train with historical data, have a significant influence on the material property of interest. In this way, the required amount of historical data is reduced and still a robust model with high accuracy is obtained.

Historical data in the context of the present invention refers to data sets including at least one structural feature and at least one material property. Such data is usually obtained by measurement of historical samples, usually by an appropriate method to directly or indirectly obtain the respective material property, for example mechanical testing such as indentation. The associated structural features can either be obtained by analyzing images of the samples similar to the method described above or they are obtained by analysis methods specialized for each structural feature.

The material model can be run on the same system as the other steps of the process or it can be run on a remote system, for example on a server or in a cloud. In this case, the structural features are sent to the remote system executing the material model and the result is received from the remote system. This is usually achieved via a communication interface.

Usually, the type of material, i.e. the chemical composition of each phase in the sample, influences the relationship between structural features and material features. In case samples are different to each other in terms of their type of material, it is preferable to take into account information about the type of material for each phase in the sample. In this way, one usually arrives at more accurate material features. The type of material can be given as general material classes, such as ceramics, resin, visco-elastic polymer such as rubber, or metals. The type of material can also be given more specifically by referring to its chemical composition, for example polystyrene, zeolite, melamine-formaldehyde resin, oak wood, boron glass. Hence, preferably, the type of material for each phase in the sample is provided.

Usually, the type of material is taken into account by choosing an appropriate model. It is either possible to set up a separate model for each type of material. This makes sense if only a few different types of materials are of interest, for example in a factory which produces a small number of different products. Alternatively, the model can use the type of material for each phase as additional input parameters. Obviously, for data-driven models, the historic data used to train the model needs to be labelled appropriately with the type of material for each phase in the sample. For physical models, typically the properties of the bulk material are chosen as these can be easily obtained from databases. The error arising from the fact that the properties of materials in small structures deviate from bulk materials is for most applications acceptable.

The method according to the present invention comprises (d) outputting the at least one material property received from the material model. Outputting can mean writing the material property on a non-transitory data storage medium, display it on a user interface or transmit it to another program either locally or on a remote system, preferably the at least one material property is output onto a user interface.

The method for determining a material property of a sample preferably comprises
   (a1) providing images of a foam sample,
   (a2) providing the type of material for each phase in the sample,
   (a3) converting the images to a representation,
   (b) extracting at least one structural feature from the representation, wherein the at least one structural feature comprises walls, struts, or nodes,
   (c) providing the at least one structural feature to a material model which is a physical model or a data-driven model which has been trained based on historical data including structural features and the type of material, and
   (d) outputting the at least one material property received from the material model.

An example how the invention can be implemented is depicted in FIG. 1. Samples may be produced in a factory 10. These are subjected to a microscopy device 11 which generates images of the sample. These images are converted to a representation by a processing unit 12. The representation is provided to processing unit 13 which extracts at least one structural feature from the representation. The at least one structural feature is provided to processing unit 14 which provides it to a model. This model has been trained by historical data obtained from a data storage device 15. The model obtains material properties which are provided to output device 16. This output device 16 may output the material property to the factory 10, for example to adjust the production parameters.

The present invention further relates to a non-transitory computer readable data medium storing a computer program including instructions for executing steps of the method according to the present invention. Computer readable data medium include hard drives, for example on a server, USB storage device, CD, DVD or Blue-ray discs. The computer program may contain all functionalities and data required for execution of the method according to the present invention or it may provide interfaces to have parts of the method processed on remote systems, for example on a cloud system.

The present invention further relates to a production monitoring and/or control system for monitoring and/or controlling material properties of a foam sample. Unless explicitly described differently hereafter, the description relating to the method including preferred embodiments also applies to the system. The system can be a computing device, for example a computer, tablet, or smartphone. Often the computing device has a network connection in order to communicate with other computing devices, such as servers or a cloud network. Production may refer to mass production in a factory or to production of several samples in the context of a research program. Monitoring is typically done in the context of quality management in order to ensure that a product is constantly within a set range of given material properties or to classify the products based on different specification, for example a high-quality product and an average-quality product. Controlling may refer to a process of picking the best samples in order facilitate and speed up a research and development process.

According to the present invention, the system comprises (a) an input unit configured to receive images showing the inner structure of the sample. Preferably the input unit comprises a user interface which allows the user to select images to be processed, for example from a local or remote storage medium or directly from a measurement apparatus analyzing the sample. Preferably, the input unit is configured to receive the type of material for each phase in the sample. The input unit may be implemented as a webservice or a standalone software package. The input unit may form the presentation or application layer. Preferably, the input unit comprises a user interface.

According to the present invention, the system comprises (b) a processing unit configured to extract at least one structural feature from the representation. The processing unit may be a local processing unit comprising a central processing unit (CPU) and/or a graphics processing units (GPU) and/or an application specific integrated circuit (ASIC) and/or a tensor processing unit (TPU) and/or a field-programmable gate array (FPGA). The processing unit may also be an interface to a remote computer system such as a cloud service.

According to the present invention, the system comprises (c) a processing unit configured to providing the at least one structural feature to a material model material model suitable for obtaining at least one material property from the structural feature. The processing unit can be the same as in (b) or a different one, for example the processing unit in (b) can be on the local machine while the processing unit in (c) is an interface to a cloud service.

According to the present invention, the system comprises (d) an output unit configured to output a material property received from the material model. The output unit may be implemented as a webservice or a standalone software package. The output unit may form the presentation or application layer. Preferably the output unit is a user interface which is configured to display the material property of the sample. The user may then take the necessary action, for example adjust production parameters if the sample is out of specification or pick samples with the highest quality in a research project. Alternatively, the output unit may include or have an interface to an apparatus which automatically adjusts production parameters or sorts the samples depending on their material properties.

EXAMPLE

Figure 2A:
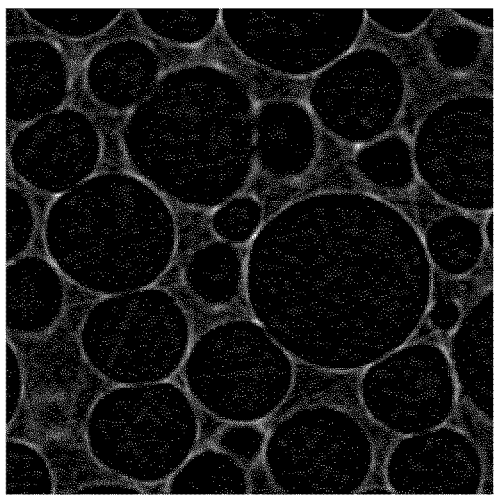
FIGS. 2a to 2g show an example of the image processing using the method of the invention.
Figure 2B:
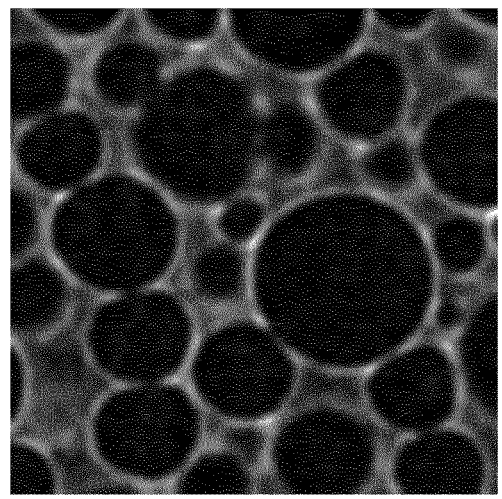
Figure 2C:
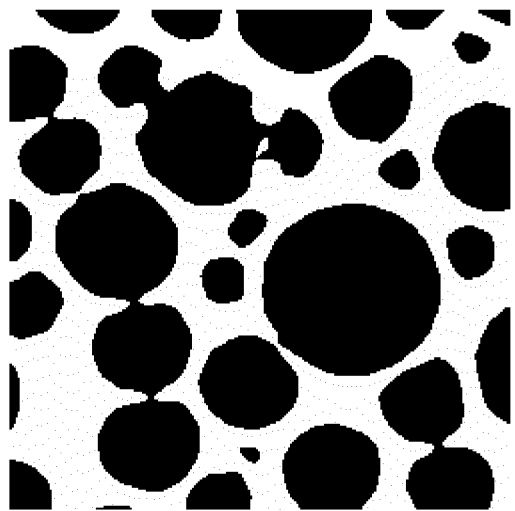
Figure 2D:
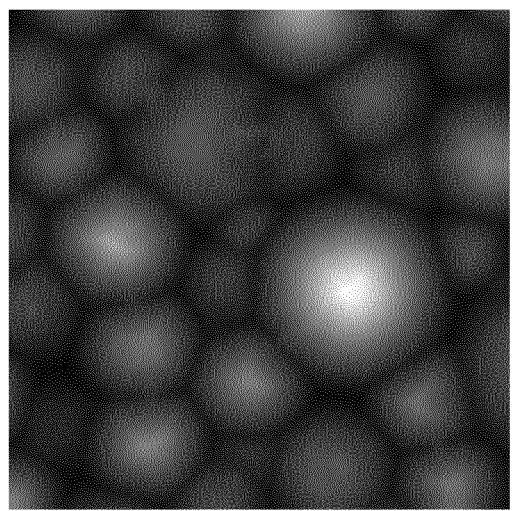
Figure 2E:
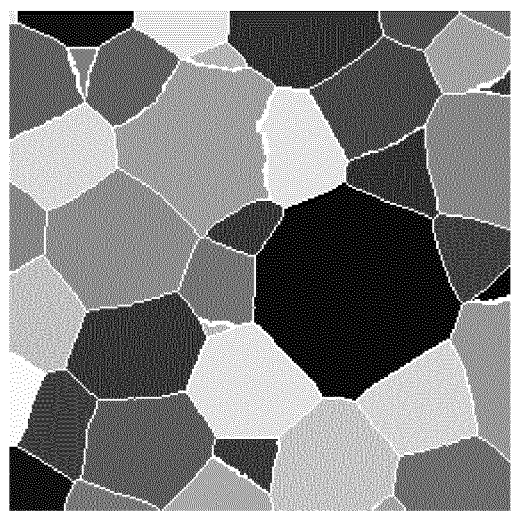
Figure 2F:
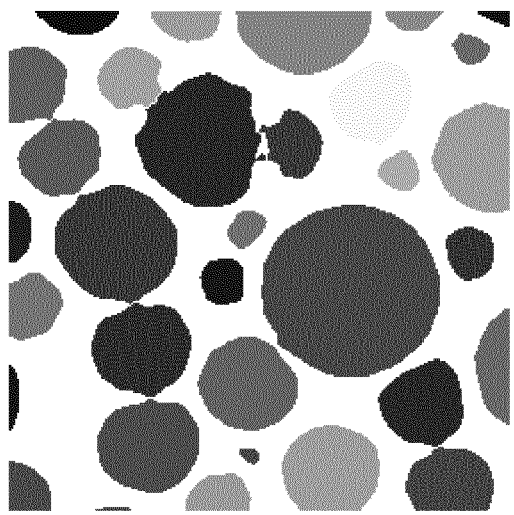
Figure 2G:
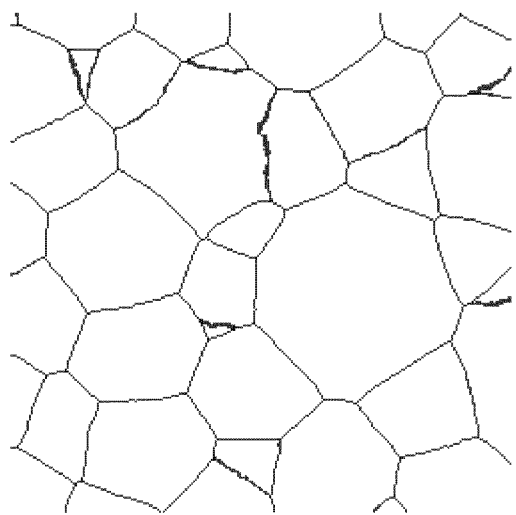

FIGS. 2a to 2g illustrate an example of how the steps (a) and (b) can be realized. FIG. 2a shows the raw data as it is obtained for example from an X-ray tomography apparatus. After applying filters for preparing binarization the image in FIG. 2b is obtained. FIG. 2c shows the outcome of applying threshold to binarize the image. For FIG. 2d a distance filter was applied on both phases, i.e. opposite negative sign in pore phase and positive sign in the material phase. Subsequently, local minima were identified and watershed algorithm with lines between cells and without masking were applied. The outcome is shown in FIG. 2e. FIG. 2f shows mask labeled cells obtained therefrom with binarized data from the image in FIG. 2c to get labeled pores. The borderlines of the watershed result depicted in FIG. 2e represent the skeleton of the foam and is shown in FIG. 2g. Therefrom voxels in skeleton can be labeled by their number of adjacent cells, i.e. a voxel with to neighboring cells represents a wall, a voxel with three neighboring cells represents a strut, and a voxel with four or more cells represents a node. Connected voxels are labeled the same type as single wall, strut, or node.

Therefrom a fraction of material located in the cell walls $\phi=0.249$ and relative density describing the ratio between the foam density ($\rho_{foam}$) and the density of the bulk material ($\rho_{bulk}$) $\rho^*=0.531$ was extracted. A relative Young's modulus $E^*=0.344$ was obtained using the formula $$E^* = \frac{E_{foam}}{E_{bulk}} = \phi \frac{\rho_{foam}}{\rho_{bulk}} + (1-\phi)\left(\frac{\rho_{foam}}{\rho_{bulk}}\right)^2 = \phi\rho^* + (1-\phi)(\rho^*)^2$$

The invention claimed is:

1. A computer-implemented method for determining a material property of a foam sample comprising:
   (a) providing a representation of the sample, wherein the representation is generated from images showing the inner structure of the sample by edge detection, surface detection, or segmenting the images by applying a threshold algorithm and receiving a type of material for each phase in the sample;
   (b) extracting at least one structural feature from the representation wherein the at least one structural feature comprises walls, struts, or nodes,
   wherein the walls correspond to material in between two particles of a different material or between two pores,
   wherein the struts correspond to material in between three particles of a different material or between three pores, and
   wherein the nodes correspond to material in between four particles of a different material or between four pores;
   (c) providing the at least one structural feature to a material model suitable for obtaining at least one material property from the structural feature, wherein the at least one material property comprises a mechanical property, a thermal property, an electrical property, or an optical property;
   (d) outputting the at least one material property received from the material model; and
   (e) monitoring and/or controlling the at least one material property of the sample.

2. The computer-implemented method according to claim 1, wherein the segmented image is subject to a distance function and a watershed algorithm.

3. The computer-implemented method according to claim 1, wherein prior to generating a representation from the images, the images are preprocessed by automatically applying saved preprocessing parameters.

4. The computer-implemented method according to claim 1, wherein the method further comprises providing the type of material of the sample and wherein the material model is specific to the type of material.

5. The computer-implemented method according to claim 1, wherein the representation is a three-dimensional representation.

6. The computer-implemented method according to claim 1, wherein the material property is displayed on a user interface.

7. The computer-implemented method according to claim 1, wherein at least two structural features are extracted from the representation and provided to the material model.

8. The computer-implemented method according to claim 1, wherein the sample is a polymer foam.

9. A non-transitory computer readable data medium storing a computer program including instructions for executing steps of the method according to claim 1.

10. A production monitoring and/or control system for monitoring and/or controlling material properties of a foam sample comprising:
    (a) an input unit configured to receive a representation of the sample, wherein the representation is generated from images showing the inner structure of the sample by edge detection, surface detection, or segmenting the images by applying a threshold algorithm, and wherein the input unit comprises a user interface;

(b) a first processing unit configured to extract at least one structural feature from the representation, wherein the at least one structural feature comprises walls, struts, or nodes, wherein the first processing unit comprises at least one of a local processing unit comprising a central processing unit, a graphics processing unit, an application specific integrated circuit, a tensor processing unit, a field-programmable gate array, or a cloud service, wherein the walls correspond to material in between two particles of different material or between two pores, wherein the struts correspond to the material in between three particles of a different material or between three pores, and wherein the nodes correspond to material in between four particles of different material or between four pores;

(c) a second processing unit configured to provide the at least one structural feature to a material model suitable for obtaining at least one material property from the structural feature, wherein the second processing unit comprises at least one of a local processing unit comprising a central processing unit, a graphics processing unit, an application specific integrated circuit, a tensor processing unit, a field-programmable gate array, or a cloud service, and wherein the at least one material property comprises a mechanical property, a thermal property, an electric property, or an optical property, (d) an output unit is a user interface configured to output the at least one material property received from the material model, and comprises an interface to an apparatus to automatically adjust production parameters or sort the foam sample depending on the at least one material property, wherein the input unit is configured to receive the type of material for each phase in the sample.

11. The production monitoring and/or control system according to claim 10, wherein the processing unit (b) and/or (c) is an interface to a remote computer system.

12. The computer-implemented method according to claim 1, wherein the sample is a zeolite, or carrier body for exhaust catalyst.

13. The production monitoring and/or control system according to claim 10, wherein the foam sample is a polymer foam, a zeolite, or carrier body for exhaust catalyst.

* * * * *